March 18, 1969 P. A. REGIS 3,433,327
BRAKING SURFACE FOR THE RIMS OF BICYCLE WHEELS
Filed June 12, 1967 Sheet 1 of 2
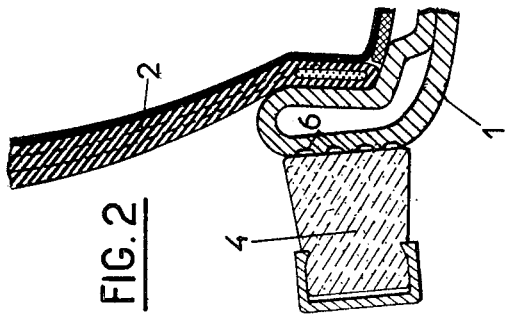
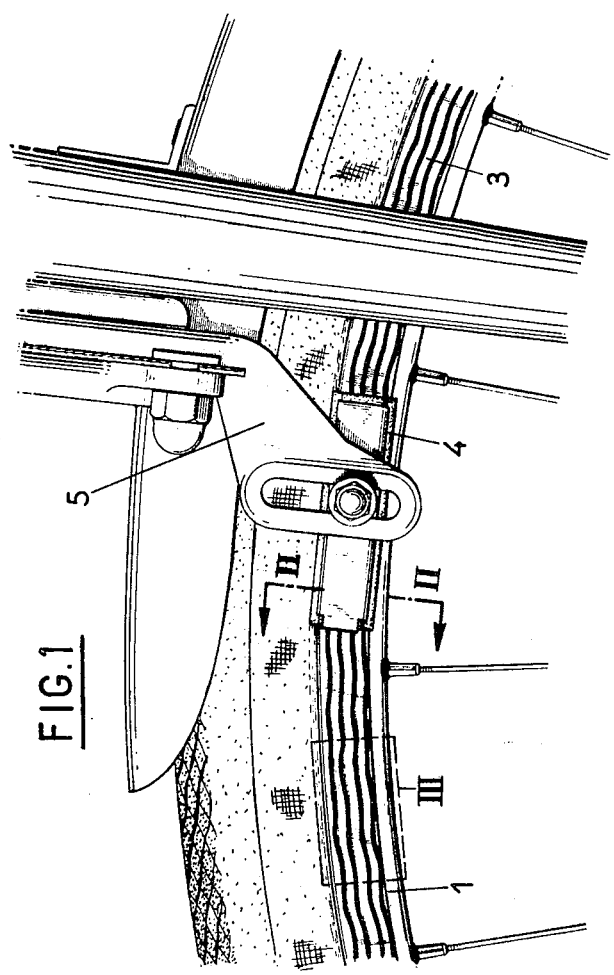
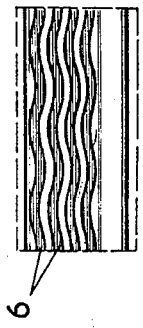

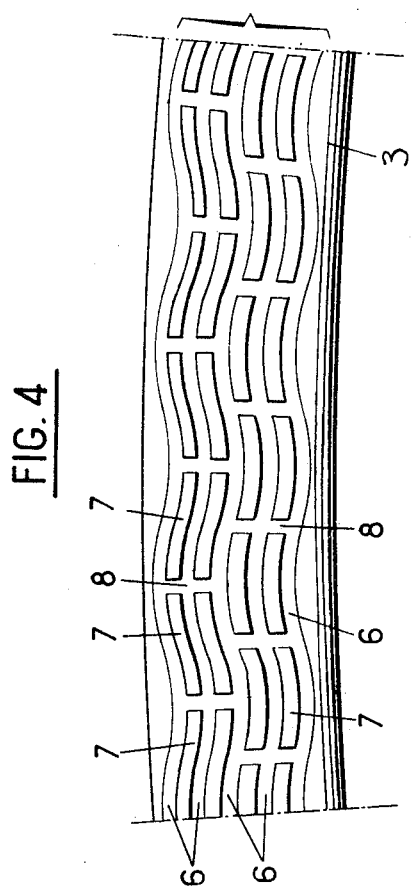

United States Patent Office 3,433,327
Patented Mar. 18, 1969

3,433,327
BRAKING SURFACE FOR THE RIMS OF BICYCLE WHEELS
Pierre A. Regis, Noyon, Oise, France, assignor to Societe Anonyme dite: Laminoirs A Froid De Thionville, Thionville, Moselle, France
Filed June 12, 1967, Ser. No. 645,153
Claims priority, application France, June 29, 1966, 67,537; Feb. 2, 1967, 94,604
U.S. Cl. 188—24                                    4 Claims
Int. Cl. B62l 1/00; F16d 65/10

ABSTRACT OF THE DISCLOSURE

A rim for a bicycle wheel having a braking surface formed with an undulating pattern of grooves positioned to be engaged by the braking surface on a brake shoe.

---

This invention relates to the rims of cycle wheels and especially those of bicycles, when these rims are contacted by brake shoes for braking purposes. This is accomplished by applying sufficient pressure to two brake shoes which are positioned on opposite sides of the rim, provided there is nothing between the brake shoes and the rim. However, when it rains, or when the bicycle is ridden through puddles of water, the rim gets wet and the brakes no longer work satisfactorily because water is a lubricant which tends to cause the brake shoes to slip on the surface of the rim. This lubricating effect is caused by a fluid film on the rim.

In order to overcome this defect it has already been suggested that the surface of the rim be roughened by providing it with a series of recessed bosses or transverse striations. These, however, instead of removing the fluid film, help to keep it on the rim by multiplying the points from which it is supplied. Circumferential striations, on the other hand, do improve the braking effect in humid weather when the brake shoes are new, because they make it easier for the fluid to flow away, but this effect soon disappears, as the brakes are used, since the shoes come to conform to the striations, so that rapid elimination of water no longer takes place, and slippage results.

The object of this invention is to provide a rim for a cycle wheel the braking surfaces of which are scored in a manner which results in effective braking under all circumstances, even in the presence of water.

The present invention is accordingly directed to the new article of manufacture which consists of a cycle wheel rim characterized by the fact that it comprises a series of parallel grooves cut in an undulating pattern so that the points of contact of each brake shoe with the rim at the moment of braking shift radially in and out as the rim turns.

In one embodiment, the undulating grooves are interrupted by short transverse grooves so that the parallel undulating grooves are in communication with each other and those portions of the rim which are not scored.

In order that the invention may be better understood, two embodiments thereof will now be described, purely by way of illustration and example, with reference to the accompanying drawings, in which:

FIG. 1 is a partial side view of a bicycle wheel equipped with a rim according to the invention;

FIG. 2 is a partial sectional view taken along the line II—II of FIG. 1, but on a larger scale;

FIG. 3 is a view showing the portion III of FIG. 1 on an enlarged scale; and

FIG. 4 is a view similar to FIG. 3 showing another embodiment of the invention on an enlarged scale.

In the drawings, reference numeral 1 indicates the rim, having a generally conventional shape, and carrying the pneumatic tire 2. This rim has two substantially parallel sides and one of the brake shoes 4 of a brake having opposed jaws 5 acts on each side. When each shoe 4 is pressed against the corresponding side 3 of the rim by closing the jaws 5, braking results with a braking torque proportional to the pressure applied.

When the sides 3 of the rim are not grooved in accordance with the invention, and are wetted with a liquid such as water, the shoes 4 slip easily on these sides because of the hydrodynamic persistence of the liquid film. It follows that the braking torque falls to an insignificant value, even when a substantial pressure is exerted by the jaws 5, thus substantially comprising the safety of the rider.

In order to avoid this, in accordance with the invention, a series of parallel grooves 6 are cut in the sides 3, having any desired section, trapezoidal for example. These grooves are shown in section on FIG. 2, and as shown in FIG. 1, have an undulating character. The angle between these grooves and the radius of the wheel is always above a certain value, below which there is the risk of causing the persistence of the very liquid film which it is desired to avoid. Moreover, the undulations cause the points of contact between the shoes and the rim to shift radially inward and outward as the shoe slides on the rim.

The first effect of this arrangement is to increase the pressure of the presumably smooth shoe on the crests of these portions of the sides 3 which are positioned between two grooves. This increase in pressure helps to rupture the fluid film more easily because the fluid need flow only a very short distance to reach an adjacent groove which will carry it off. Moreover, the wearing of the shoe, which inevitably results from sliding contact between the shoe and the rim, is distributed over the entire braking surface of the shoe, because the points of contact between the shoe and rim shift radially inward and outward. For this reason the braking surface of the shoe remains smooth and cannot conform to the grooves, so that the braking effectiveness remains constant until the shoes are completely worn out.

The rim just described makes it possible to ensure effective braking under all circumstances, even in the presence of water, thus making bicycling much safer.

In the embodiment illustrated on FIG. 4, transverse grooves 8 connect the grooves 6 to each other and to the remainder of the rim. These grooves 8 are about as deep as the grooves 6, so that the bottoms of the various grooves are continuous, and each side 3 carries only one series of ribs 7, separated from each other by grooves and having an undulating pattern.

The exact location of the transverse grooves is not important. They may be positioned at any point along the undulations and may be opposite each other, or staggered two by two, as shown, or completely staggered, without thereby affecting the operation of the device.

As a result of this arrangement, the water on the ridges 7 is forced laterally into the grooves 6 by the pressure of contact between the ridges and shoe, which is slightly increased because the ridges are narrow. The water collected in the grooves 6 flows longitudinally for a short distance at most equal to the length of a ridge 7, and then escapes laterally through grooves 8, travelling from one groove 6 to the next away from the center of the rim, until it passes beyond the area to which the brake shoe is applied. There is thus no possibility of increasing the pressure against the portion of the shoe at the side where the wheel leaves it, but there is instead a uniform distribution of the pressure and the braking force over the entire surface of the brake shoe. Moreover, the brakes 8 in the ridges 7 help break up the fluid film. Consequently, with rims formed in this manner, the brakes retain their effectiveness even in heavy rains.

The grooves according to the invention may be formed by knurling the rims with a conventional knurling tool.

What is claimed is:

1. A bicycle wheel rim comprising an annular plate having an external braking surface exposed to the weather and positioned to be engaged by a brake member as said wheel rotates, said braking surface being provided with a series of substantially parallel grooves which extend only part way through said plate in an undulating pattern in a generally circumferential direction with respect to said wheel.

2. A wheel rim as claimed in claim 1 in which said braking surface is provided with additional grooves which extend transversely with respect to the grooves forming said undulating pattern.

3. A wheel rim as claimed in claim 1 comprising means for draining away from said braking surface any liquid falling thereon, said means consisting of transverse grooves interconnecting the grooves in said undulating pattern and extending to points beyond the periphery of said braking surface.

4. In combination, a wheel rim as claimed in claim 1 and a brake shoe mounted to be brought into and out of frictional engagement with said braking surface.

References Cited

UNITED STATES PATENTS

| 2,656,021 | 10/1953 | Butler | 188—218 X |
| 2,987,143 | 6/1961 | Culbertson | 188—218 X |
| 3,025,686 | 3/1962 | Lewis | 64—30 |
| 3,301,356 | 1/1967 | Pompa | 188—218 |
| 3,305,048 | 2/1967 | Brilando | 188—24 |

MILTON BUCHLER, *Primary Examiner.*

THOMAS W. BUCKMAN, *Assistant Examiner.*

U.S. Cl. X.R.

188—218